United States Patent
Weidner et al.

(10) Patent No.: US 10,041,419 B2
(45) Date of Patent: Aug. 7, 2018

(54) VALVE FLAP DEVICE

(75) Inventors: Thomas Weidner, Edenkoben (DE); Rico Weinert, Gommersheim (DE); Alexander Schinko, Mannheim (DE); Marcel Womann, Neustadt an der Weinstrasse (DE); Karlheinz Reichling, Landau (DE)

(73) Assignee: TENNECO GMBH, Edenkoben (DE)

( * ) Notice: Subject to any disclaimer, the term of this patent is extended or adjusted under 35 U.S.C. 154(b) by 550 days.

(21) Appl. No.: 13/508,996

(22) PCT Filed: Nov. 10, 2010

(86) PCT No.: PCT/EP2010/067235
§ 371 (c)(1),
(2), (4) Date: Jul. 26, 2012

(87) PCT Pub. No.: WO2011/058070
PCT Pub. Date: May 19, 2011

(65) Prior Publication Data
US 2012/0280161 A1     Nov. 8, 2012

(30) Foreign Application Priority Data

Nov. 10, 2009   (DE) .................. 10 2009 052 423

(51) Int. Cl.
*F16K 1/18*   (2006.01)
*F02D 9/10*   (2006.01)
(Continued)

(52) U.S. Cl.
CPC .......... *F02D 9/1045* (2013.01); *F02D 9/102* (2013.01); *F16K 1/18* (2013.01); *F16K 1/2071* (2013.01);
(Continued)

(58) Field of Classification Search
CPC . F16K 1/18; F16K 1/22; F16K 1/2071; F16K 1/2266
(Continued)

(56) References Cited

U.S. PATENT DOCUMENTS 1,993,069 A * 3/1935 McConnell, Jr. ............. 137/519
2,022,395 A * 11/1935 White et al. .................. 251/306
(Continued)

FOREIGN PATENT DOCUMENTS

DE    43 13 454 A1    10/1984
DE    38 02 243 A1    8/1989
(Continued)

*Primary Examiner* — John K Fristoe, Jr.
*Assistant Examiner* — Christopher Ballman
(74) *Attorney, Agent, or Firm* — Hudak, Shunk & Farine Co., LPA

(57) ABSTRACT

A valve flap device having at least one valve housing having a shaft comprising a bearing surface and a valve axis, the shaft being rotationally supported about the valve axis by means of the bearing surface in the valve housing. A bearing element having a sliding bearing surface, wherein the bearing surface of the shaft contacts the sliding bearing surface. A bearing housing provided on the valve housing, in which the bearing element is supported at least in the radial direction to the valve axis, wherein the bearing element has an outer surface contacting the bearing housing. The support of the shaft is intended to be sufficiently tightly sealed, even for gaseous media, while simultaneously ensuring precise and statically determinate support. To this end, the bearing element is designed as a separate component coupled to the bearing housing about the valve axis with respect to the circumferential direction, such that the relative position between the bearing element and the bearing housing does not change in the circumferential direction when the shaft is rotated.

13 Claims, 4 Drawing Sheets

(51) Int. Cl.
  *F16K 1/226* (2006.01)
  *F16K 1/20* (2006.01)
  *F16K 1/22* (2006.01)

(52) U.S. Cl.
  CPC .............. *F16K 1/22* (2013.01); *F16K 1/2266* (2013.01); *Y10T 137/0525* (2015.04)

(58) Field of Classification Search
  USPC .......................................... 251/305–308, 214
  See application file for complete search history.

(56) References Cited

U.S. PATENT DOCUMENTS

| | | | | |
|---|---|---|---|---|
| 2,924,424 | A * | 2/1960 | Titterington | 251/305 |
| 3,498,584 | A * | 3/1970 | Bowers | 251/305 |
| 3,778,028 | A * | 12/1973 | Graves | F16K 1/2265 137/375 |
| 3,837,620 | A * | 9/1974 | Malloy et al. | 251/306 |
| 3,843,090 | A * | 10/1974 | Schneider et al. | 251/215 |
| 3,991,974 | A * | 11/1976 | Bonafous | F16K 1/2265 251/152 |
| 4,204,558 | A * | 5/1980 | Johnson et al. | 137/315.24 |
| 4,589,628 | A | 5/1986 | Barker et al. | |
| 4,669,499 | A * | 6/1987 | Miyake et al. | 137/375 |
| 4,744,572 | A * | 5/1988 | Sahba et al. | 277/641 |
| 4,759,530 | A * | 7/1988 | Iff | F16K 27/0272 251/214 |
| 4,877,339 | A * | 10/1989 | Schuster et al. | 384/218 |
| 5,632,304 | A | 5/1997 | Kempka et al. | |
| 6,022,000 | A * | 2/2000 | Laulhe | F16K 1/2268 251/214 |
| 6,598,854 | B1 * | 7/2003 | Jessberger et al. | 251/214 |
| 2005/0189513 | A1 | 9/2005 | Ino et al. | |
| 2007/0131889 | A1 * | 6/2007 | Unbehaun et al. | 251/305 |

FOREIGN PATENT DOCUMENTS

| | | |
|---|---|---|
| DE | 43 05 123 A1 | 9/1994 |
| DE | 94 19 537.4 U1 | 12/1994 |
| DE | 44 26 028 C1 | 11/1995 |
| DE | 196 43 630 A1 | 4/1998 |
| DE | 100 42 923 A1 | 3/2002 |
| DE | 101 05 526 A1 | 8/2002 |
| DE | 102 07 060 A1 | 8/2003 |
| DE | 10 2004 032 845 A1 | 2/2006 |
| DE | 10 2004 032 856 A1 | 2/2006 |
| DE | 10 2004 032 974 A1 | 2/2006 |
| DE | 60 2004 000 705 T2 | 5/2007 |
| DE | 20 2008 005 992 U1 | 9/2008 |
| DE | 20 2007 006 463 U1 | 10/2008 |
| EP | 0 835 998 A1 | 4/1998 |
| EP | 1 887 200 A1 | 2/2008 |
| GB | 2 277 368 A | 10/1994 |
| WO | 2010 108620 A1 | 9/2010 |

* cited by examiner

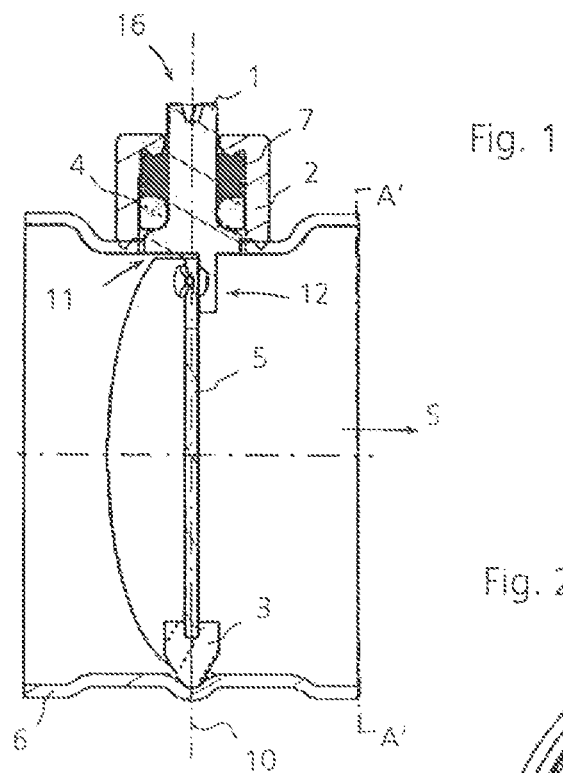
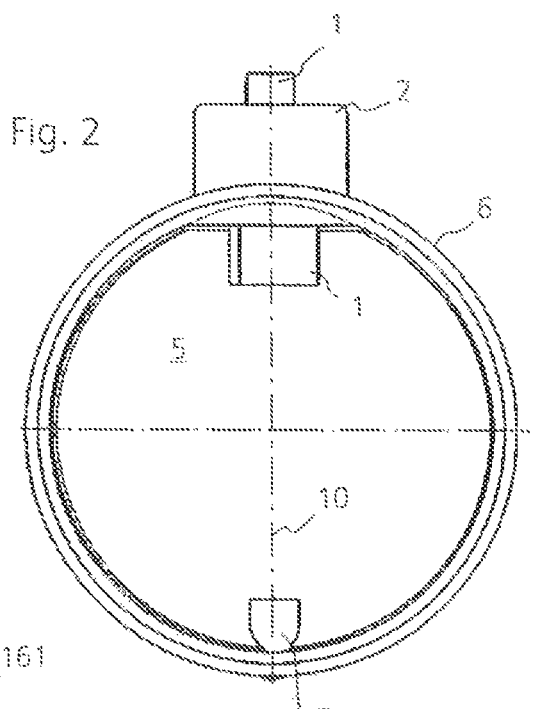
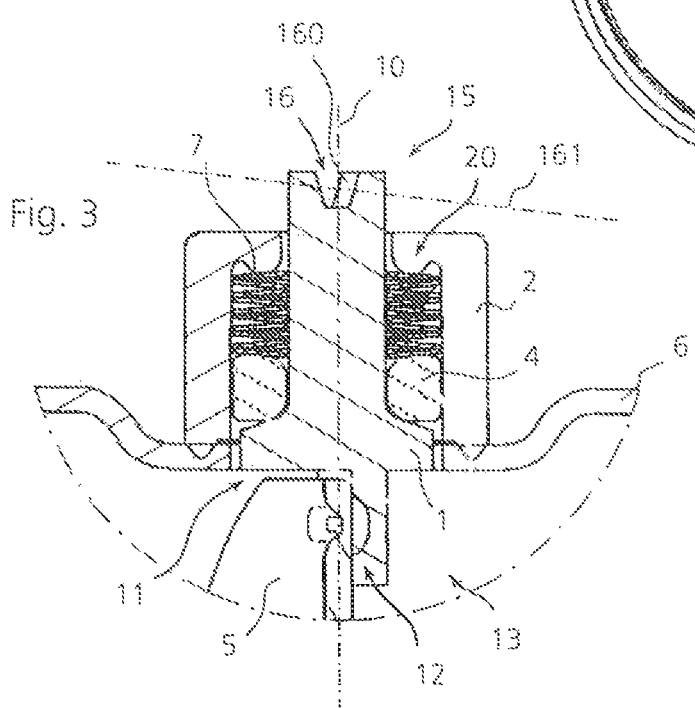

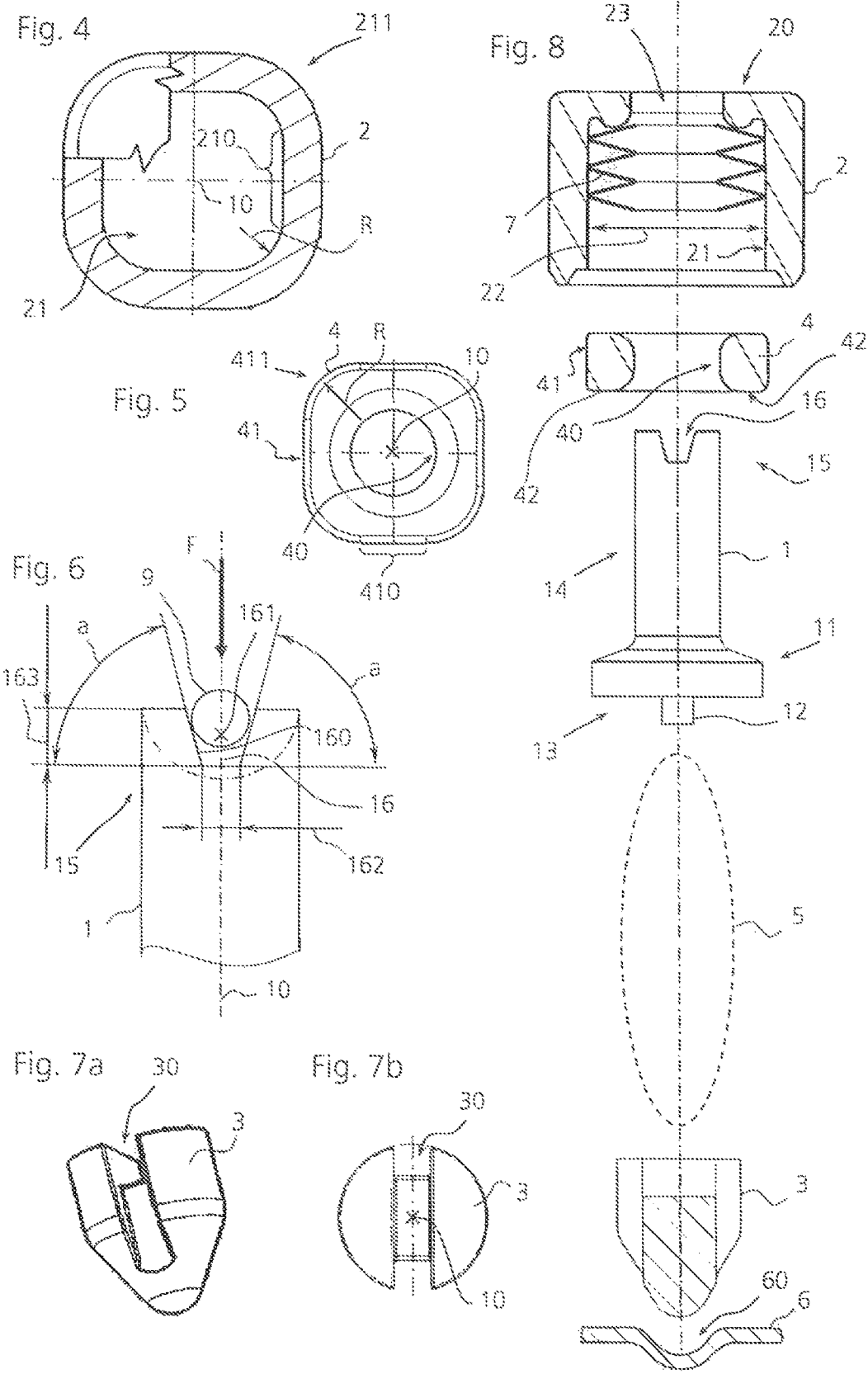

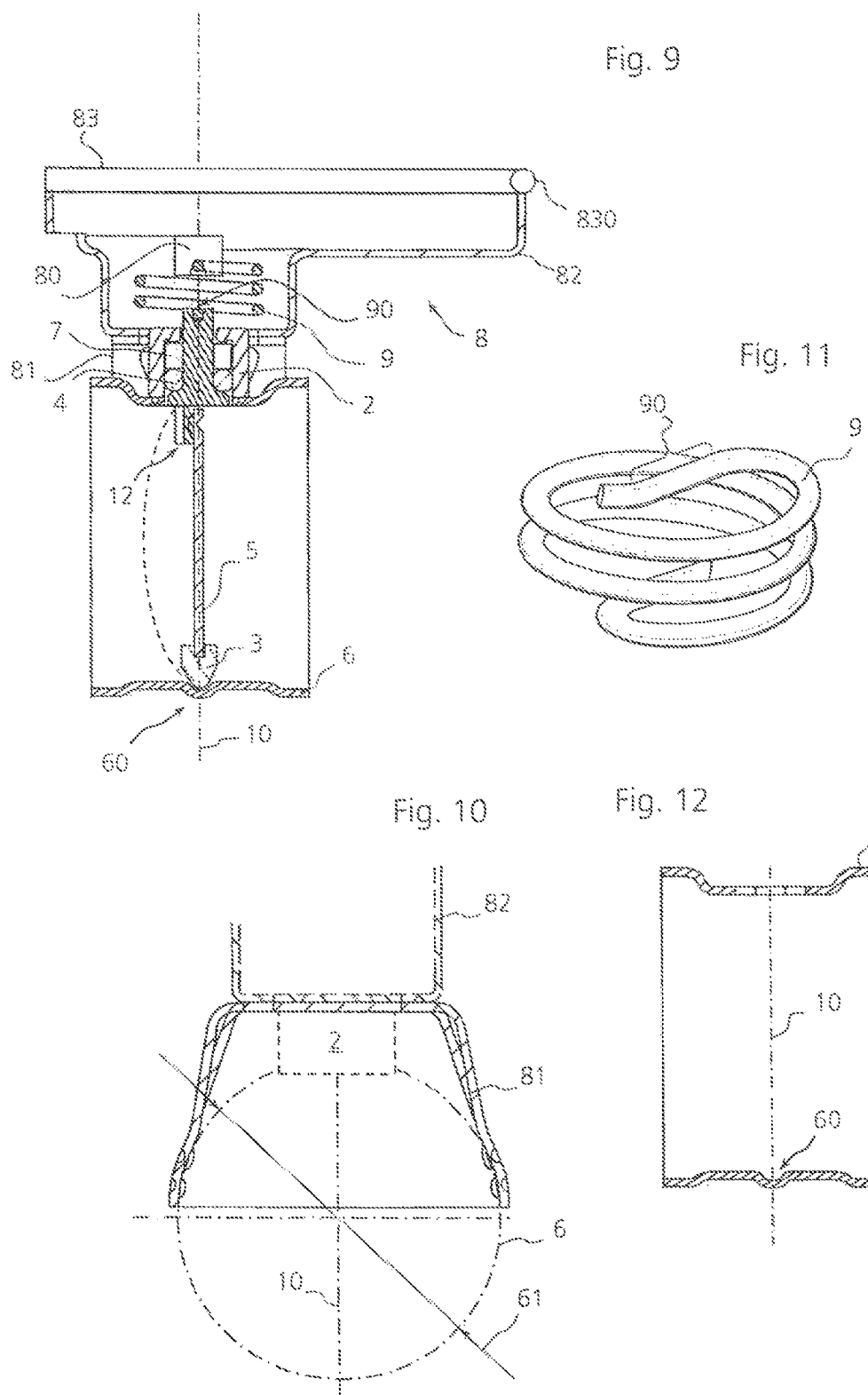

VALVE FLAP DEVICE

FIELD OF THE INVENTION

The invention concerns a valve flap device comprising at least one valve housing and a shaft which can turn about a valve axis with a bearing surface for a bearing in the radial direction to the valve axis and with a shaft shoulder for a bearing in axial direction to the valve axis. Furthermore, the valve flap device comprises a bearing element bearing the shaft in the valve housing with a sliding bearing surface for the shaft shoulder, wherein the bearing element is mounted in the bearing housing able to move in both axial directions. A bearing housing is provided, fastened to the valve housing, in which the shaft and the bearing element are arranged, serving for the radial support of the bearing element. By a spring element the bearing element is pretensioned relative to the bearing housing in the axial direction against the shaft shoulder.

BACKGROUND OF THE INVENTION

A valve device is described in EP 1 887 200 A1, having a valve flap to control the flow through it. The valve flap can be controlled via an electric drive unit with a drive shaft. For this, the valve shaft is connected by a torsion spring to the drive shaft. The valve shaft is supported by a bearing in the bearing housing.

An exhaust pipe valve is described in DE 60 2004 000 705 T2 with a housing and a bearing sleeve, which is fixed in the housing in the axial and radial direction. The valve spindle is arranged able to turn in the bearing sleeve. The valve disk is placed on the valve spindle.

A throttle valve shaft is described in DE 43 05 123 A1, which is mounted in bearing, sleeves that are loaded by spring force against axial walls of the housing. The bearing sleeves are radially movable inside a housing recess in order to compensate for dimension variances between the stopping surfaces and the throttle flap shaft mounting or the boreholes by changing position or radial displacement of the bearing sleeves.

As the closest prior art, DE 10 2004 032 845 A1 describes a valve flap of this kind, which is pretensioned and triple supported in the valve housing and in which the shaft bearing can move axially in the bearing housing to compensate for thermal movements of the valve flap in the axial direction. The shaft is mounted in the bearing housing by two bearing bodies, a bearing ring, and a bushing, while the two bearing bodies rotate with the shaft in the bearing housing. For this, a corresponding sliding parrot at least a slight friction is provided between the bearing bodies and the bearing housing.

SUMMARY OF THE INVENTION

The problem of the invention is to configure and arrange a valve flap device such that the bearing of the shaft is also sufficiently tight to gaseous media and at the same time assures a simple bearing arrangement.

The problem is solved according to the invention in that the bearing element is configured as a separate structural part, which is coupled to the bearing housing about the valve axis with respect to the circumferential direction so that the relative position between the bearing element and the bearing housing does not change when the shaft turns in the circumferential direction about the valve axis.

As a result of this, only the shaft turns in the bearing element and the bearing element can be tightly sealed and abutted against the bearing housing, since a relative movement between the bearing element and the bearing housing in the circumferential direction to the valve axis need not be considered, either in the cold or the hot operating state of the valve. This design enables a defined mounting and thus a simple calculation and a simple coordination of structural parts. Furthermore, the fixation of the bearing element on the bearing housing ensures a precise mounting relative to the frictional partner, because only a relative movement between the shaft and the bearing element is possible. An uncontrolled turning of the bearing element in the bearing housing is prevented. The shaft is mounted only by a bearing element that abuts tightly against the shaft in linear manner.

In terms of tightness, it is advantageous for the bearing element to abut against the shaft shoulder in a direction parallel to the valve axis, because a second abutment surface is formed here, in addition to the radial abutment of the shaft on the bearing element, and thus an additional sealing surface between the shaft and the bearing element.

For this, it is advantageous for the spring element to work between the bearing element and the bearing housing and for the bearing element to be movable in the direction of the valve axis in the bearing housing and to be pretensioned by the spring element in the direction of the shaft shoulder, parallel to the valve axis. Thanks to the ability to move the bearing element under pretension in the axial direction, the axial bearing forces of the shaft are nearly constant in all possible temperature ranges.

A valve flap is provided that can swivel about the valve axis, being supported by a bearing pin in the valve housing in the axial and radial direction to the valve axis, wherein the bearing pin is pretensioned indirectly by the valve flap and the shaft by the spring element in the axial direction. Besides the very simple mounting of the valve flap in the valve housing, this ensures that neither the valve flap nor other structural parts can flutter or wobble during operation. The valve flap forms a self-supporting element in this way.

For the driving of the shaft and the attachment of a valve flap it can be advantageous to provide that the first end of the shaft forms a seat for the attachment of a valve flap and at the other opposite end in the direction of the valve axis there is provided a recess or a valve disk for the attachment of a driving device for the valve flap. Between the two ends, in the middle region of the shaft, the bearing surface is provided.

In connection with the configuration and arrangement of the invention it can be advantageous to arrange a spring at the recess of the shaft, the spring connecting the shaft to a drive shaft of a driving device in rotational-elastic manner about the valve axis and the spring decoupling the shaft in the direction of the valve axis from the drive shaft. The recess is fashioned in the shape of a groove and arranged in the radial direction to the valve axis, so that a rod-shaped region of the spring abuts against the groove free of play and form-fitting in a direction perpendicular to the valve axis, thanks to a pretensioning of the spring in the direction of the valve axis. The shaft is pretensioned anyway by the spring element or the disk spring pack in the axial direction, i.e., in a direction parallel to the valve axis. Thus, it is advantageous to the function for the spring to also be pretensioned in the axial direction against the shaft, thereby making possible a slack-free abutment and thus a slack-free control of the valve flap.

For this, it can be advantageous for the groove to have two groove flanks that are opposite in relation to a groove axis, the respective groove flank being arranged relative to a normal to the valve axis with an angle a larger than 45 degrees and smaller than 90 degrees. This enables a clamping between the spring and the shaft, accomplished solely by the force of the spring. An additional mechanical fastening of the spring to the shaft is thus not necessary.

In regard to the form fitting in the circumferential direction, it is advantageous for at least part of the inside of the bearing housing and at least part of the outside of the bearing element to have geometrically similar cross sectional shapes, not being rotationally symmetrical to the valve axis, and oriented parallel to the valve axis, so that a skewing of the two bodies relative to each other by virtue of the diverse shapes of housings and bearing elements can be prevented.

For this, it is advantageous to provide at least one axially extending bulge on the outer surface of the bearing element and at least one axially extending groove, receiving the bulge, on the inside of the bearing housing, wherein the bulge forms a form-fitting rotation lock in the groove.

Alternatively, the outer surface of the bearing element has at least one flat region arranged parallel to the valve axis and one inner side of the bearing housing has at least one flat segment arranged parallel to the valve axis and the region can abut against the segment, thereby forming a form-fitting rotation lock.

It is especially advantageous for the outer surface to have a square cross section in a plane perpendicular to the valve axis, wherein the four corner regions each have an outer radius R between 0.5 mm and 50 mm. This symmetrical shape is easy to manufacture and it affords a sufficient form fitting.

In regard to the sealing it is preferable for the bearing housing to have a housing opening, through which the shaft is led, while a shoulder is provided at the housing opening and the spring element fashioned as a disk spring abuts tight against the shoulder. In terms of a simple construction, it may be advantageous for the shoulder to have an inwardly directed bulge and for the spring element to be placed against the bulge in a direction parallel to the valve axis. In this way, the use of a disk spring pack as the spring element becomes possible, providing a pretension and at the same time an additional sealing of the shaft in the bearing housing by the labyrinth of individual disk springs.

The fundamental principle of the invention is based on a twofold supporting of the shaft, where the shaft is supported only once by the one bearing element in the radial direction in the bearing housing and the valve flap is supported directly or indirectly only once in the valve housing in the radial direction. The bearing element is made from a ceramic or a metal alloy for sliding bearings.

In terms of tightness, it can be advantageous for the bearing housing to be joined firmly and by a material connection to the valve housing, or for the bearing housing to be fashioned as a single part and of the same material as the valve housing.

BRIEF DESCRIPTION OF THE DRAWINGS

Further advantages and features of the invention are explained in the patent claims and in the specification and depicted in the figures. There are shown:

FIG. 1, a representation of a valve flap device with a shaft, a valve axis, a housing, a bearing element, a spring element, a valve flap and a valve housing in a cross section parallel to the valve housing;

FIG. 2, a representation of a valve flap device per FIG. 1 in a cross section A-A' perpendicular to the valve housing;

FIG. 3, a detail view per FIG. 1:

FIG. 4, the bearing housing in a cross section perpendicular to the valve axis;

FIG. 5, the bearing element in a cross section perpendicular to the valve axis;

FIG. 6, one end of the shaft with a V-shaped recess and one region of a spring in a cross section perpendicular to the valve axis;

FIG. 7a, a perspective view of a bearing pin;

FIG. 7b, the bearing pin in a cross section perpendicular to the valve axis;

FIG. 8, an exploded drawing per FIG. 1 without the valve housing;

FIG. 9, the valve flap device per FIG. 1 with a driving device and a spring for coupling the shaft to a drive shaft;

FIG. 10, a representation of the housing and the valve housing supplemented with a budge housing and a motor housing;

FIG. 11, a perspective view of a spring with a straight region;

FIG. 12, the valve housing with an indentation in a cross section perpendicular to the valve axis;

DETAILED DESCRIPTION OF THE INVENTION

Figure 13:
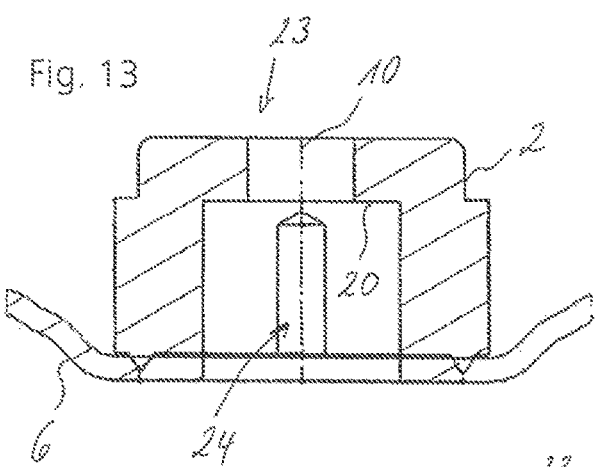
FIG. 13, a representation of the bearing housing in cross section with grooves for a form fit.

FIG. 1 shows a valve flap device that comprises, in addition to a shaft 1 mounted by a bearing element 4 in a bearing housing 2, also a valve flap 5 with a bearing pin 3 and a valve housing 6. The cross section runs parallel to the valve housing 6, i.e., in the direction of flow S of the medium.

The valve flap 5 turns about a valve axis 10 in a rotary range of up to 90 degrees and in FIGS. 1 and 2 it is represented in a position in which the pipe cross section of the valve housing 6 is almost closed. FIG. 2 shows a sectional view A-A per FIG. 1, perpendicular to the flow direction S in the valve housing 6.

As shown in FIG. 3, the shaft 1 turns about the valve axis 10 and has at one end 13 a seat 12 for the valve flap 5. At the opposite end 15 of the shaft in the direction of the valve axis 10, there is provided a recess 16 for a spring 9, represented more clearly in FIGS. 6 and 9. The recess 16 is configured as a V-shaped groove and has accordingly two flanks 160, which are arranged parallel to a groove axis 161.

Between the two ends 13, 15 the shaft 1 has a bearing surface 14, shown more closely in FIG. 8, by which the shaft 1 is supported in the radial direction to the valve axis 10 and can turn about the valve axis 10. For the supporting, a separate bearing element 4 is provided in the form off a sliding bearing bush, which is mounted in the bearing housing 2 and entirely surrounds the shaft 1 with the sliding bearing surface 40.

The basic principle of the invention requires a bearing arrangement for the valve flap 5 that is tight against the valve housing 6, so that no gaseous medium can escape through the bearing via the bearing housing 2. For this, the shaft 1 is sealed off against the bearing element 4. For the sealing, in addition to the bearing surface 14, there is provided a shaft shoulder 11, against which the sliding bearing surface 40 and the support surface 42 (FIG. 8) of the bearing element 4 can partially abut. In order for the bearing element 4 to abut tightly enough, the bearing element 4 is pressed or pretensioned by a spring element 7, fashioned as a disk spring pack, in a direction parallel to the valve axis 10, against the shaft shoulder 11 by the support surface 42. This pretensioning is transmitted by the shaft 1 to the valve flap 5 and via the bearing pin 3 to the valve housing 6. The sequence of individual transmission elements is shown in FIG. 8 in an exploded drawing. The bearing element 4 and the bearing pin 3 bring about a two-point bearing system, which absorbs radial and axial forces in relation to the valve axis 10. For this, as shown more closely in FIGS. 1, 9 and 12, the valve housing 6 has an indentation 60 relative to the basic diameter 61 (FIG. 10), in which the bearing pin 3 is mounted.

The bearing housing 2 has a shoulder 20, against which the disk spring pack 7 abuts in the axial direction, i.e., in a direction parallel to the valve axis 10. The shoulder 20 is narrower than the inner diameter 22 of the bearing housing 2 and at the same time it forms a housing opening 23, through which the shaft 1 is led in the direction of a driving device 8, shown more closely in FIG. 9.

The individual disk springs of the disk spring pack 7 lie tightly against each other and are mounted on the inside 21 of the bearing housing 2 such that here as well there is a sufficiently tight proximity of structural parts. Between the disk spring pack 7 and the shaft 1 sufficient hearing play is provided to prevent friction between the shaft 1 and the disk spring pack 7 or the individual disk spring elements 7.

In order to assure the required pretensioning of the bearing element 4, the bearing element 4 is mounted in the bearing housing 2 so that it can move in the axial direction. In the radial direction, the bearing element 4 lies by its sliding bearing surface 40 against the shaft 1. In the direction of the shaft shoulder 11, the bearing element 4 lies by its support surface 42 against the shaft 1. But in order to achieve a defined support, the bearing element 4 is locked against a rotation about the valve axis 10 in the bearing housing 2, so that no relative movement can occur between the bearing element 4 and the bearing housing 2 in the circumferential direction.

FIGS. 4 and 5 show a preferred embodiment, where the inside 21 of the bearing housing 2, against which the bearing element 4 is supported, and also the outer surface 41 of the bearing element 4, by which the bearing element 4 is supported in the bearing housing 2, are configured non-rotationally symmetrical to the valve axis 10. In this way, a form fit is produced between the bearing element 4 and the bearing housing 2 in the circumferential direction about the valve axis 10, which prevents a relative rotary movement between the bearing housing 2 and the bearing element 4.

As can be seen in FIGS. 4 and 5, the corresponding surfaces 21, 41 are shaped nearly square. The corner regions 211, 411 have a radius R of 5 mm. Between the corner regions 211, 411 there is provided a segment 210 or a region 410 that is formed straight and flat, parallel with the valve axis 10.

The shaft 1 in regard to the rotation about the valve axis 10 is coupled via a spring 9 to the drive shaft 80 of a driving device 8, so that the rotary movement from the drive shaft 80 is relayed via the spring 9 to the shaft 1. In the axial direction, the shaft 1 is entirely decoupled from the drive shaft 80.

Figure 14:
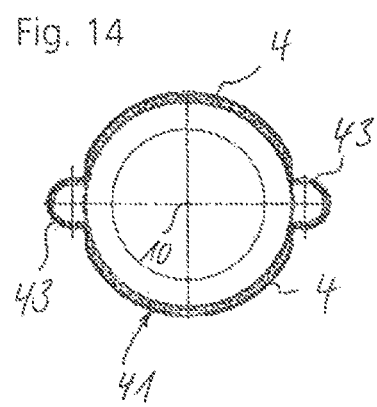
FIG. 14, a top view of a bearing element with bulges for the form fit.
Figure 15:
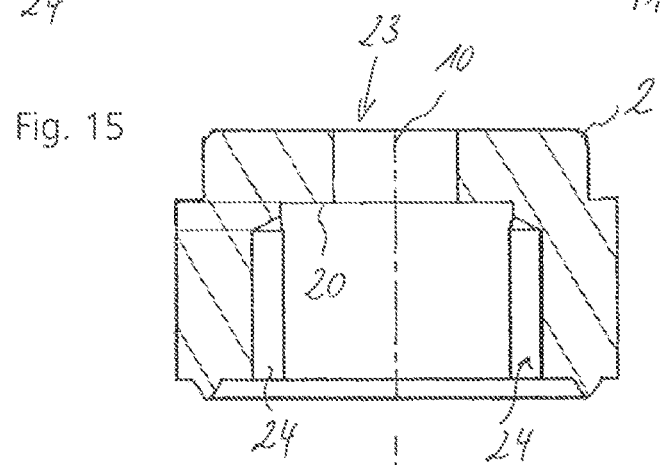
FIG. 15, a sectional view of a bearing housing per FIG. 13 rotated by 90 degrees.
Figure 16:
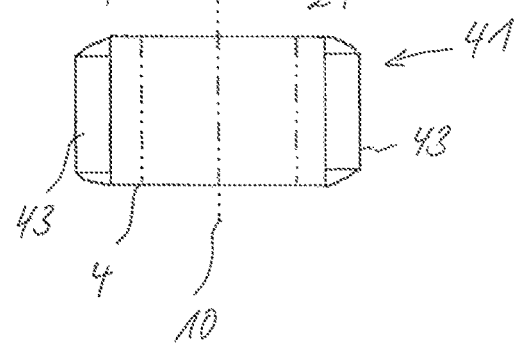
FIG. 16, a bearing element per FIG. 14, arranged coaxial to the bearing housing.

Another preferred embodiment of a rotary lock is shown in FIG. 13 to 16. Here, the bearing housing 2 per FIGS. 13 and 15 has two opposite grooves 24, which are made in the radial inner surface of the bearing housing 2 parallel to the valve axis 10. The bearing element 4 according to FIGS. 14 and 16 has two corresponding bulges 43, which are molded onto the outer surface 41 of the bearing element 4. The bearing element 4 is pushed into the bearing housing 2 in the axial direction, the two bulges 43 being received by the two grooves 24. This nonsymmetrical shape to the valve axis 10, just as described in FIGS. 4 and 5, prevents a turning in the circumferential direction, while a movement of the bearing element 4 in the bearing housing 2 in the direction of the valve axis 10 is assured.

The required wear-free and precise control of the valve flap 5 is also realized according to the invention in regard to the connection of the spring 9 to the two shafts 1, 80. For this, the V-shaped recess 16 is provided at the end 15 of the shaft 1, at its end face. A similar recess 16 is also provided at the end face of the drive shaft 80. The two groove flanks 160, arranged symmetrically to the groove axis 161, are each inclined by an angle of (90-a) degrees with respect to a line parallel with the valve axis 1 and subtend the angle a with a line normal to the valve axis 10. The spring 9 shown in FIG. 11 has a round cross sectional profile and is formed straight in one region 90. The length of the region 90 is somewhat greater than the diameter of the shaft 1 in the region of the recess 16, so that the spring 9 with the region 90 can be arranged in the recess 16. By the spring force F, which is presented by the prestressing of the spring 9 in the axial direction, the region 90 is pressed into the groove base of the recess 16 and forms a clamping connection with the groove flanks. The angle of inclination of the groove flanks 160 is between 2 and 4 degrees. The width 162 at the groove base is smaller than the diameter of the cross section profile of the spring 9 and the depth 163 corresponds at least to half the diameter of the cross section profile of the spring 9.

The bearing pin 3 is shown in FIGS. 7a and 7b. The bearing pin 3 forms essentially a rotationally symmetrical truncated cone with a groove 30 running around three sides, in which the valve flap 5 is mounted according to FIGS. 1, 2 and 9.

In FIG. 9, the entire valve flap device with the driving device 8 is shown. The driving device 8 comprises, besides the drive shaft 80 which is rotationally elastically connected to the shaft 1 by the spring 9, a bridge housing 81 not shown more closely in FIG. 10, by which the valve housing 6 is connected to the engine housing 82. The engine housing 82 is closed at the top by a housing cover 83, having a port 830 for an electrical connection. The bridge housing 81 is placed on the valve housing 6, shown more closely in FIG. 12. The indentation 60 for the bearing pin 3 is provided in the valve housing 6.

What is claimed is:
1. A valve flap device, comprising at least:
a) one valve housing
b) a shaft which can turn about a valve axis with a bearing surface for a bearing in a radial direction to the valve axis and with a shaft shoulder for a bearing in an axial direction to the valve axis,
c) a bearing element bearing the shaft in the valve housing with a sliding bearing surface for the bearing surface of the shaft and with a supporting surface in direct contact with the shaft shoulder, wherein the bearing element is mounted in a bearing housing able to move in both axial directions relative to the shaft,
d) the bearing housing fastened to the valve housing, in which the shaft and the bearing element are arranged, for radial support of the bearing element, e) a spring element by which the bearing element is pretensioned relative to the bearing housing in the axial direction and in direct contact against the shaft shoulder, wherein f) the bearing element is directly coupled in a form-fitting manner to the bearing housing, about the valve axis that prevents a relative rotary movement with respect to a circumferential direction between the bearing housing and the bearing element.

2. The valve flap device according to claim 1, wherein a valve flap is provided that can swivel about the valve axis in the valve housing, being supported by a bearing pin in the valve housing in the axial and radial direction to the valve axis, wherein the bearing pin is pretensioned indirectly by the valve flap and the shaft by the spring element in the axial direction.

3. The valve flap device according to claim 2, wherein at least part of an inside surface of the bearing housing and at least part of an outer surface of the bearing element have geometrically similar cross sectional shapes a) that prevent a relative rotary movement in the circumferential direction between the bearing housing and the bearing element, and b) that are oriented parallel to the valve axis.

4. The valve flap device according to claim 3, wherein at least one axially extending bulge is provided on the outer surface of the bearing element and at least one axially extending groove, receiving the bulge, on the inside surface of the bearing housing, and wherein the bulge forms a form-fitting rotation lock in the groove.

5. The valve flap device according to claim 4, wherein the outer surface of the bearing element has at least one flat region arranged parallel to the valve axis and one inner side of the bearing housing has at least one flat segment arranged parallel to the valve axis and the region can abut against the segment, thereby forming a form-fitting rotation lock.

6. The valve flap device according to claim 5, wherein the bearing housing has a housing opening, through which the shaft is led, while a shoulder is provided at the housing opening and the spring element fashioned as a disk spring abuts tight against the shoulder.

7. A system consisting of a valve flap device according to claim 6 and an exhaust system for an internal combustion engine or for a motor vehicle.

8. The valve flap device according to claim 1, wherein at least part of an inside surface of the bearing housing and at least part of an outer surface of the bearing element have geometrically similar cross sectional shapes a) that prevent the relative rotary movement in the circumferential direction between the bearing housing and the bearing element, and b) that are oriented parallel to the valve axis.

9. The valve flap device according to claim 8, wherein at least one axially extending bulge is provided on the outer surface of the bearing element and at least one axially extending groove, receiving the bulge, on the inside surface of the bearing housing, and wherein the bulge forms a form-fitting rotation lock in the groove.

10. The valve flap device according to claim 9, wherein the outer surface of the bearing element has at least one flat region arranged parallel to the valve axis and one inner side of the bearing housing has at least one flat segment arranged parallel to the valve axis and the region can abut against the segment, thereby forming a form-fitting rotation lock.

11. The valve flap device according to claim 1, wherein the bearing housing has a housing opening, through which the shaft is led, while a shoulder is provided at the housing opening and the spring element fashioned as a disk spring abuts tight against the shoulder.

12. A system consisting of a valve flap device according to claim 1 and an exhaust system for an internal combustion engine or for a motor vehicle.

13. A method for the rotational mounting of a shaft about a valve axis in a bearing housing, with a valve flap arranged on the shaft, wherein the shaft is mounted in the radial direction by a single bearing element in the bearing housing, comprising the steps of: using a sliding bearing bush as the bearing element and coupling the sliding bearing bush to the bearing housing directly in form fitting manner to prevent twisting in the circumferential direction of the valve axis and at the same time the sliding bearing bush is in direct contact with the shaft and pushed in both directions of the valve axis relative to the shaft in the bearing housing and pretensioned by a spring element.

* * * * *